May 19, 1970 H. CZERNY 3,513,396
FEEDBACK CONTROL FOR SWEEP AMPLIFIER OF SWITCHING REGULATING APPARATUS
Filed Nov. 14, 1967
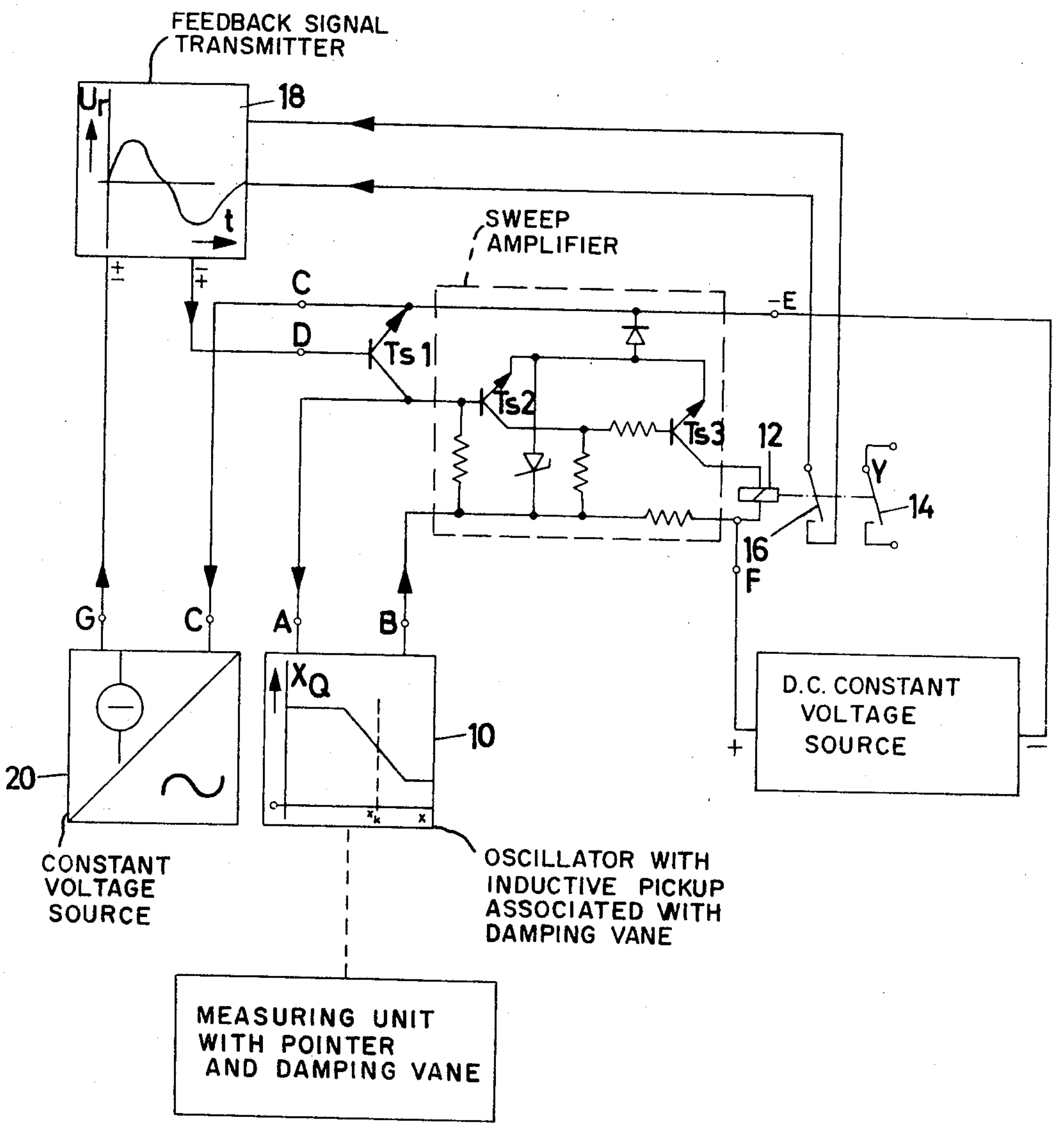
Heribert Czerny
*INVENTOR.*
*BY*
Darbo, Robertson & Vandenburgh 3,513,396

FEEDBACK CONTROL FOR SWEEP AMPLIFIER OF SWITCHING REGULATING APPARATUS

Heribert Czerny, Dusseldorf-Nord, Germany, assignor to W. H. Joens & Co. G.m.b.H., Dusseldorf, Germany Filed Nov. 14, 1967, Ser. No. 682,770
Claims priority, application Germany, Nov. 15, 1966, J 32,241
Int. Cl. G01r *27/00;* H01h *47/32*
U.S. Cl. 324—157 7 Claims

ABSTRACT OF THE DISCLOSURE

Switching regulating apparatus including a sweep amplifier controlled by a tapped inductive pickup which can be adjusted relative to the measured value in accordance with a set value measured by a measuring unit, the input of the sweep amplifier being connected to a voltage divider fed by DC voltage and comprising the DC feed voltage input of an oscillator and a resistor which can be varied by the feedback.

The invention relates to switching regulating apparatus comprising an electromechanical measuring unit with a pointer which supports a damping vane for measuring the set value, a tapped inductive pickup which can be adjusted relative to the measured value in accordance with the set value, a high-frequency oscillator which can be damped by the pointer vane, a sweep amplifier controlled by the pickup, and a feedback system by means of which the switching point of the sweep amplifier can be varied.

In conventional regulating apparatus the feedback voltage is fed into the measuring circuit. If the feedback is flexible, the feedback will have only a slight effect on the value obtained by regulation in the final condition. However, while feedback is fully effective, the measuring unit does not indicate the actual measured value but rather an apparent measured value modified by the feedback. This feature is undesirable, particularly in cases in which it is necessary to observe the actual measured value.

To avoid these disadvantages it is known to apply the feedback not to the measuring circuit but to the circuit which compares measured values and set values, the measuring unit and an instrument containing the measuring unit will then indicate the correct measured value. However, this will alter the position of the sweep amplifier switching point. The application of feedback therefore results in an apparent and temporary change of the set value, instead of an apparent change of the measured value.

Normally, the measured value is compared with the set value by means of a high-frequency pick-up which can be adjusted relative to the measured value in accordance with the set value and which may, for example, be mounted on a set value pointer. This high-frequency pickup incorporates a high-frequency oscillator which can be damped by means of a damping vane disposed on the measuring unit pointer.

In known apparatus in which feedback is applied via the set value, the oscillation amplitude of the oscillator is varied by means of a suitable feedback signal so that the switching point position is displaced. This is done by varying the loss factor of an oscillating circuit provided for damping purposes by means of a NTC resistor, which can be heated by the feedback signal.

In another known arrangement in which the feedback effect functions in the form of set value displacement, the frequency and therefore the amplitude of an oscillator which is used for measuring the set value, is varied by means of a capacitance diode which represents part of the oscillating circuit that can be damped by the vane.

This procedure is also accompanied by displacement of the switching point.

The two previously mentioned systems have the disadvantage that they require action upon the high-frequency circuit, an effect which may lead to undesirable reactions and disturbances. It is also a disadvantage that additional control wiring to the oscillator is necessary and that, in the first case, a relatively high control power level is required.

The object of the invention is to avoid the disadvantages of the known systems. According to the invention, the input of a sweep amplifier has connected to it a DC fed voltage divider comprising the DC feed input of the oscillator and a resistor which is varied by the feedback.

Feedback is accordingly no longer applied to the high-frequency side of the oscillator. Instead, the oscillator and its DC voltage feed input is used as part of the input voltage divider for the sweep amplifier. The DC voltage feed input functions as a resistance which depends on the oscillating condition of the oscillator: this effect is determined entirely on the DC side. The feedback signal is also made effective purely by DC means, by varying the other resistor of the input voltage divider. Screening and reaction effects are therefore absent. If the input voltage divider resistance which is varied by the feedback is reduced (feedback with positive tendency), it will also be necessary for the internal resistance of the oscillator to be reduced in order to regain the threshold value of the sweep amplifier, at which said amplifier will perform switching action. However, this means that the switching point of the sweep amplifier will be disposed in a position of the control vane which is other than that obtained without feedback.

Feedback is applied to the amplifier which may appropriately be disposed at some distance from the pickup and the high-frequency oscillator. It is not necessary for a screened high-frequency conductor or an additional feedback control conductor to be connected to the oscillator.

The variable resistor may take the form of a transistor driven by the feedback.

Since the feedback voltage may be either positive or negative, the system is so arranged that the feedback voltage ($U_r$) and a biasing voltage, supplied for example from a constant voltage source, is connected to the base of the transistor (T=1).

Advantageously, the pick-up is so constructed that the DC feed voltage input of the high-frequency oscillator represents a resistance which varies linearly with the travel of the pointer vane over a relatively large range.

An embodiment of the invention now described by way of example is illustrated in the accompanying drawing, partly diagrammatically.

The regulator according to the invention incorporates a measuring circuit, not shown, with a sensing element, for example, a thermocouple and a measuring unit with a pointer. The measuring circuit is constructed in the usual manner. However, by contrast to most conventional regulators, the feedback voltage is not fed into the measuring circuit. The pointer therefore indicates the actual correct measured value. The measuring unit pointer supports, in usual manner, a damping vane which moves between two coils of an oscillator 10, while damping or undamping respectively said oscillator. The pick-up is so constructed that the internal resistance of the DC feed voltage input of the oscillator varies substantially linearly with the travel of the pointer vane on the measuring unit pointer over a relatively wide range.

The DC feed voltage input A–B of the oscillator 10, forms part of an input voltage divider for a circuit amplifier incorporating the transistors T*s*2 and T*s*3. The upper resistance of the voltage divider is formed by a transistor Ts1. If the vane of the measuring unit pointer is moved between and beyond the coils of the high-frequency pick-up, the internal resistance on the DC feed voltage input of the oscillator 10 will rise. Since a constant DC voltage is applied from E–F to the voltage divider represented by the oscillator 10 and the transistor Ts1, the potential on the base of the transistor Ts2 will rise. When said potential reaches a certain value, the sweep amplifier Ts2, Ts3 will be driven and the relay 12 will be energised. The manipulated variable Y is switched via a relay contact 14. A feedback signal transmitter 18 is simultaneously connected by a second relay contact 16 to produce a suitable feedback voltage $U_r$. Said feedback voltage $U_r$ is applied to the base of the transistor Ts1 and varies the resistance of the emitter collector connection. This also varies the resistance of the oscillator 10 and therefore that position of the damping vane at which the sweep amplifier switches. Since the feedback voltage may be either negative or positive, the base of the transistor Ts1 will be supplied, by means of a constant voltage source 20, or the like, with a bias voltage. The constant voltage source 20 and the feedback signal transmitter 18 are connected in series between C and D.

If the feedback is not operational, the transistor Ts1 will be driven by the constant voltage source 20 to half its effective slope. The feedback voltage $U_r$ may then assume either positive or negative values, so that the base of the transistor Ts1 is driven only at positive potential relative to the collector (conductor C). If the transistor Ts1 is driven with a feedback voltage having a positive or negative tendency, the resistance of its collector emitter connection will decrease or increase respectively.

The switching point of the sweep amplifier is therefore obtained with a corresponding lower internal resistance of the oscillator 10 and accordingly when the measured value pointer with the damping vane reaches another position.

The device operates as follows: The input resistance of the oscillator 10 as "seen" from the DC voltage supply source (+F, −E) varies as a function of the pointer travel $x$ in accordance with the graph shown in block 10. The supply voltage from constant voltage source E, F is applied to the oscillator 10 through transistor Ts1, so that Ts1 and the DC input impedance of the oscillator at A, B form a voltage divider. The base of transistor Ts2 is connected to the junction of 10 (at A) and the collector of Ts1, which is the intermediate point of the voltage divider. If the input impedance of oscillator 10 is lowered due to the vane being between the oscillator pick-off coils while the impedance of the transistor Ts1 remains constant, the potential at said intermediate point on the voltage divider will go towards +F. This will cause the sweep amplifier to conduct.

Relay 12 thus becomes energized and contacts 14 and 16 are closed. This causes some switching operation at Y, such as the switching on or off of a heater and, at the same time energizes the feedback signal transmitter 18. This feedback signal transmitter is an appropriate RC network and produces some kind of feedback signal (as required in the particular control loop), upon closure of contact 16 at the time $t_0$. This signal could, for example, be a spike (when viewed with the coordinates being voltage and time) which is relatively linear on the upswing side and decays in a curve on the final side. This feedback signal is applied to the base of transistor Ts1 and lowers the transistor impedance accordingly, i.e., in accordance with the signal waveform.

With a voltage divider of two resistances R1 and R2 and supplied with a constant voltage U, the potential at the junction (or intermediate point) will be, for example, $$U\frac{R1}{R1+R2}$$

If both resistances are reduced by a factor say of two, the potential of the junction will remain the same. Thus the change of the impedance of the transistor Ts1 and the change of potential at the junction counteracts the change of impedance of oscillator 10 and corresponding change of potential of the junction (base of Ts2) as caused by the vane.

In other words, with changed resistance of the oscillator and Ts1 caused by the feedback signal, it would be necessary to move the pointer and vane through an additional travel, in order to change the state of the sweep amplifier. This has the same effect as if the response or switching point of the sweep amplifier had been changed by the feedback.

I claim:

1. In a switching regulating apparatus comprising a direct current voltage supply, an electromechanical measuring device for measuring a measured value, said device having a pointer and a damping vane connected to the pointer, a high frequency oscillator having a direct current feed voltage input and including an inductive pickup operatively associated with said vane to vary the damping of the oscillator in accordance with the position of the vane with respect to the pickup, a sweep amplifier having an input and an output, and feedback means to produce a signal for varying the switching point of the sweep amplifier, the improvement comprising:
- variable resistor means connected in series with said oscillator voltage input and with said voltage supply, said resistor means and said oscillator voltage input forming a voltage divider across said supply with a tap on the voltage divider between said resistor means and said oscillator input, said sweep amplifier being connected to said tap, said resistor means being connected to the feedback means for varying the resistance of the resistor means in accordance with the feedback signal.

2. In a switching apparatus as set forth in claim 1, wherein said variable resistor means comprises a transistor controlled by the feedback means.

3. In a switching apparatus as set forth in claim 2, wherein said transistor has a base, a collector and an emitter, said feedback signal being a voltage signal applied to said base, said apparatus including a constant voltage source means connected to said transistor to apply a bias voltage thereto.

4. In an apparatus as set forth in claim 3, wherein the resistance of said oscillator at said voltage input varies linearly with the travel of the pointer over a relatively wide range.

5. In an apparatus as set forth in claim 4, wherein the high frequency oscillator and the sweep amplifier are spaced apart, and including an unscreened double conductor means connecting the oscillator and the sweep amplifier.

6. In an apparatus as set forth in claim 1, wherein the resistance of said oscillator at said voltage input varies linearly with the travel of the pointer over a relatively wide range.

7. In an apparatus as set forth in claim 1, wherein the high frequency oscillator and the sweep amplifier are spaced apart, and including an unscreened double conductor means connecting the oscillator and the sweep amplifier.

References Cited

UNITED STATES PATENTS

| | | | |
|---|---|---|---|
| 2,153,986 | 4/1939 | MacLaren | 324—99 |
| 2,824,285 | 2/1958 | Hunt | 324—99 |

RUDOLPH V. ROLINEC, Primary Examiner

E. F. KARLSEN, Assistant Examiner

U.S. Cl. X.R.

236—78; 317—148.5